United States Patent [19]
Wheaton, III et al.

[11] 3,778,223
[45] Dec. 11, 1973

[54] DEVICE FOR INJECTION BLOW MOLDING PVC BOTTLES

[75] Inventors: Theodore C. Wheaton, III, Ocean City; Albert J. Tamagni, Vineland; Robert W. Moshinsky, Blackwood, all of N.J.

[73] Assignee: Wheaton Industries, Millville, N.J.

[22] Filed: Oct. 18, 1971

[21] Appl. No.: 189,930

[52] U.S. Cl. .................. 432/227, 34/1, 219/359
[51] Int. Cl. ............................................. F27d 3/00
[58] Field of Search ............... 263/4, 5; 219/359; 34/1; 432/9, 227, 231

[56] References Cited
UNITED STATES PATENTS

| 1,724,867 | 8/1924 | Andresen | 263/5 R |
| 3,627,283 | 12/1971 | Hittner | 263/4 |
| 2,060,065 | 11/1936 | Gill et al. | 219/359 X |
| 3,536,306 | 10/1970 | Selivanov et al. | 263/4 X |

Primary Examiner—John J. Camby
Attorney—Paul & Paul

[57] ABSTRACT

Core rods or mandrels, on which PVC parisons are first injection molded and subsequently blown into bottles, are thermally conditioned prior to injection molding of the parison thereon, by a heating unit including means for selectively heating various segments of the core rod along the length thereof. In the preferred form of the present invention, compressed air is passed through a tubular electrical resistance heating element along the length thereof and reversed at one end thereof so as to pass in an opposite direction through an annular space surrounding the tubular heating element. The outer wall of the annular space includes numerous openings aligned with the core rod to be thermally conditioned, each of these individual openings being disposed so as to direct heated air onto a preselected segment of the core rod. Preferably the device also includes baffles or side walls to direct the heated air over the core rod being treated.

1 Claim, 4 Drawing Figures

DEVICE FOR INJECTION BLOW MOLDING PVC BOTTLES

This invention relates to means and method for thermally conditioning the core rods in an injection blow molding machine to permit the effective and efficient injection blow molding of polyvinylchloride (PVC) bottles.

The injection blow molding of forming hollow bottles is well known. While various types of injection blow molding apparatus have been designed and used, the most common forms of such apparatus include mandrels or core rods about which a parison or preform is first injection molded and thereafter blown into final bottle form. In one commercially used form of such apparatus, several sets of such core rods project radially from a turret carrier which repetitively cycles each such set of core rods from an injection station to a blow station and then to one or more idle stations and back to the injection station. In such machines, the injection station includes injection molds, usually with multiple cavities corresponding to the number of core rods projecting in a given direction from the turret carrier. A like number of blow molds are located at the blow mold station. A stripper or bottle ejector is commonly located at one of the idle work stations.

Because the blowability of the parison formed on a core rod may be seriously impaired if the core rod is so hot as to cause degradation of the plastic parison, it is well known to control carefully the surface temperature of each core rod prior to the injection of the parison thereon. Overheating of core rods is a common problem in mass production and the usual expedient to solve this problem (in turret type machines) is to blow cool air over the core rods at one of the idle work stations. In other types of injection blow molding machines, core rods are often cooled internally.

Notwithstanding this prior art, however, numerous problems have been presented to those who have tried to injection blow mold PVC bottles and, as far as is known, prior to the present invention no practical and reliable apparatus and/or method has been devised to injection blow mold PVC bottles.

It is therefore an object of the present invention to provide a method and apparatus, for use in conjunction with conventional injection blow molding technology, to form injection blow molded PVC bottles.

More particularly, it is the object of the present invention to provide a particular method and apparatus for use in turret type injection blow molding machines whereby such machines may be used effectively and efficiently to produce good quality PVC bottles.

These and other objects, which will become apparent in the course of the subsequent discussion, have been met by a thermal conditioning device and method for precisely and controllably imparting heat to a core rod prior to the formation of the parison thereon, whereby various segments of the core rod along the length thereof are selectively heated. A high quality, blowable PVC parison may then be formed thereon.

In the preferred form of the present invention, the thermal conditioning device comprises a double walled tubular heater, the inner wall of which includes a resistance heating element and the outer wall of which includes openings for directing heated air from within the device onto preselected portions of the core rod to be conditioned. Air is introduced at the center of one end of the device and heated as it passes axially through the device along the length thereof. At the opposite end its flow direction is reversed and it enters the annular space surrounding the inner wall of the device, exiting the device, as mentioned above through holes in the outer wall.

This invention may be better understood by reference to the following discussion, taken in conjunction with the appended claims and the attached drawings, in which:

Figure 1:
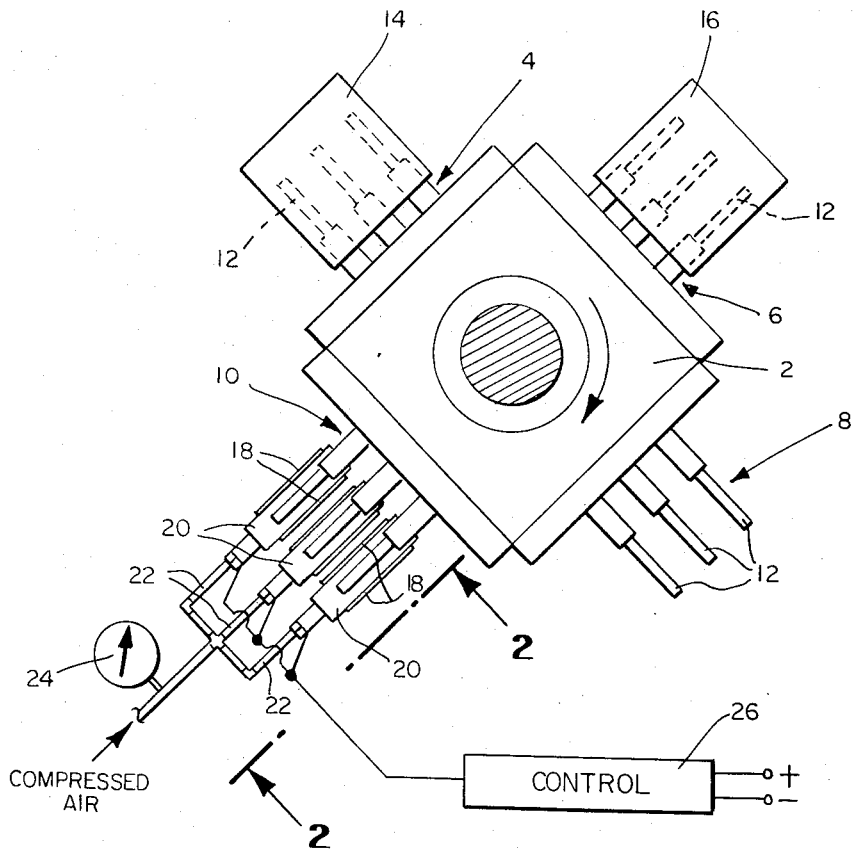
FIG. 1 is a top view of a turret transfer mechanism of an injection blow molding machine including the core rod conditioning device of the present invention.

Referring more specifically to FIG. 1 there is shown transfer turret 2 of a conventional type of injection blow molding machine with sets 4, 6, 8 and 10 of radially projecting core rods 12. Sets 4 and 6 of core rods 12 are disposed in schematically illustrated injection molds 14 and blow molds 16. Sets 8 and 10 of core rods 12 are disposed in what are known as idle work stations of the machine wherein blown bottles are usually stripped from core rods 12 and wherein, as shown in FIG. 1, the core rod conditioning device of the present invention is to be utilized. In operation, transfer turret 2 rotates 90° between each cycle of the machine, raising slightly on its vertical axis, after injection mold 14 and blow mold 16 have been opened, to clear the mold sets. After the transfer movement, transfer turret 2 lowers once again into position wherein core rod sets are seated in injection blow mold sets 14 and 15, respectively.

In accordance with the present invention, the core rods in core rod set 10 in FIG. 1 are conditioned, prior to their transfer to injection molds 14, by the core rod conditioning device of the present invention, utilizing the method of the present invention. This core rod conditioning device, as shown more clearly in the elevation view of FIG. 2, includes side baffles 18 projecting upwardly around core rods 12 of set 10 from heating units 20 disposed below each of these core rods. Compressed air, from a source thereof not shown, is introduced through inlet lines 22 to heating units 20. Gauge 24 is provided to ensure supply of air at a proper pressure to heating devices 20. Automatic controller 26 is provided to control the flow of air to each of the heating units 20.

Figure 2:
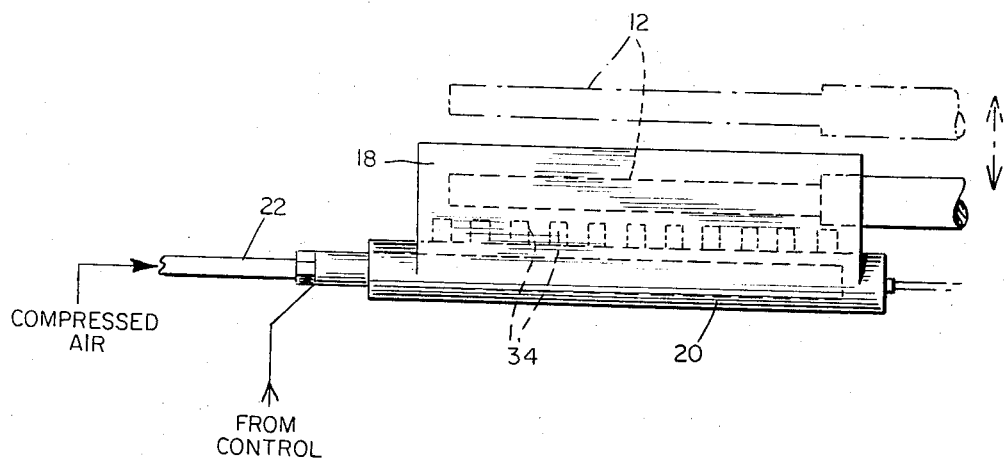
FIG. 2 is a side view of the core rod conditioning device of the present invention.

As shown by phantom lines in FIG. 2, core rods 12 are raised above the side baffles 18 between cycles so as to clear side baffles 18 during the transfer movement of transfer unit 2, which movement provides for the transfer of one set of conditioned core rods previously treated by heating units 20 into injection mold 14 while transfering a second set of core rods into position for conditioning by heating units 20.

Figure 3:
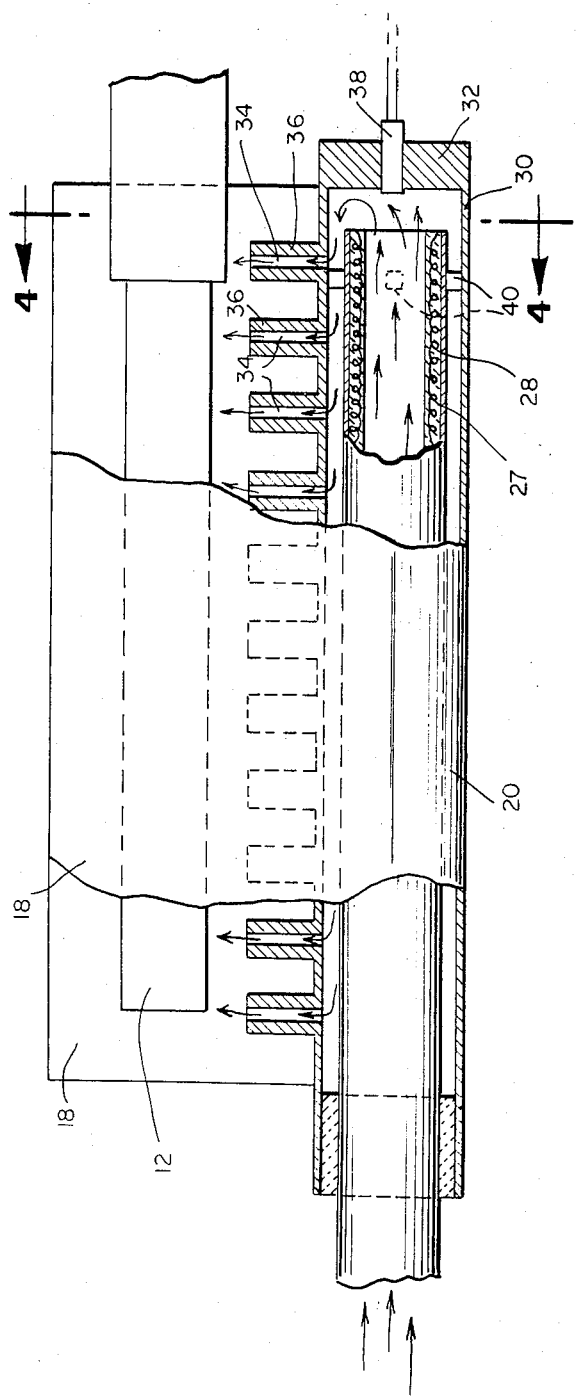
FIG. 3 is an exploded side view, partially in section, of the core rod conditioning device of the present invention.
Figure 4:
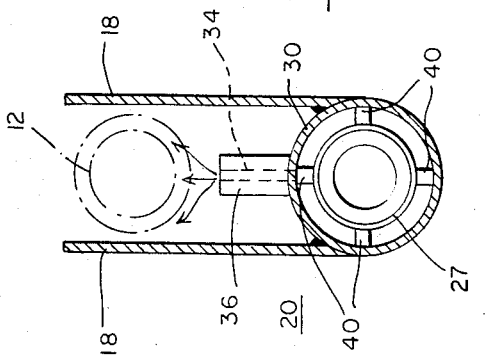
FIG. 4 is a front sectional view of the core rod conditioning device of the present invention shown in FIG. 3.

As better seen in the partially cutaway enlarged view of FIG. 3, heating unit 20 of the present invention comprises an inner tube 27 with a heating element 28 imbedded in the walls thereof. Surrounding inner tube 26 is an outer chamber wall 30 closed at one end 32 and having on the top side thereof numerous openings 34 surrounded by tubular directors 36 for directing heated air up onto preselected portions of core rod 12. Temperature sensing device 38 is provided to determine the temperature of heated air in heating unit 20. Support members 40 are provided to position inner tube 26 within outer chamber wall 30. Temperature sensing device 38 may be connected to controller 26 for closed loop control of air flow into heating units 20 or may give a direct output reading of temperature for manual control of air input.

In the method of the present invention and in the operation of the core rod conditioning device of the present invention air or some other conditioning gas is heated, such as by being passed through inner tube 26 along the length thereof being heated thereby. The direction of the gas thus heated is reversed at the opposite end of heating unit 20 and passes in a reversed direction through the annular space surrounding inner tube 26 exiting heating unit 20 through openings therein positioned so as to direct the gas flow toward a core rod to be conditioned. Thus heated gas is passed into contact with each core rod to be conditioned at a preselected position thereon. Obviously, one such heating unit is provided for each core rod to be conditioned in any given core rod set.

The primary function of the present invention is to controllably heat and thereby to condition core rods for subsequent injection molding thereon of a blowable PVC parison. Temperature control of the core rod in such cases is critical. Moreover temperature distribution along the length of the core rod in such cases is also very critical. For that purpose, it is important to determine the heat sink or heat absorption qualities of any particular core rod and for segments of each such core rod along the length thereof. Similarly, the tendency to build up heat at different locations along the length of the core rod may result from the uneven distribution of the plastic mass in the blowable parison formed thereon in the course of repeated mass production cycles. The heating tendency of core rods in such cases must be carefully evaluated and the temperature distribution reached in the core rod when the system is in equilibrium during a mass production operation must be taken into account so that heating unit 20 may be controlled to heat selectively the core rod segments where temperature depressions would otherwise occur.

Most importantly, therefore, openings in the outer wall of the heating unit of the present invention must be distributed so as to direct heated gas or air onto only that portion of each core rod needing such heat conditioning but not toward those portions where such heating is not required and particularly not toward those portions where heat buildup otherwise occurs and wherein heating would produce degradation problems in the molded PVC parison at that point.

Thus, the present invention has two important features. First, it recognizes the criticality of heat conditioning core rods for injection molding of blowable PVC parisons. Secondly, it recognizes that such heat conditioning must be precisely controlled so as to maintain a preselected temperature distribution along the length of each core rod, heating the segments thereof only as needed, thereby presenting overheating of any portion of such core rods. A careful determination of the temperature distribution characteristics occuring in any production sample, taking into account particularly the core rod itself and the parison mold thereon is very important. Utilization of such information and application of the present invention thereto results in the production of high quality injection mold blowable PVC parisons.

While the present invention has been described with respect to a particular embodiment thereof, it should be understood that this invention is not limited thereto and the appended claims are intended to cover other forms and modifications thereof, particularly those which will be apparent to those skilled in the art and which are within the true spirit and scope of the present invention. Among such obvious modifications are the substitution of the combustion gas products for compressed and heated air. It will also be apparent that while any individual heater unit may include numerous outlet openings for heated gas, any of such openings may be plugged or made smaller as needed for a given manufacturing set-up. Thus, a single heating unit may be adapted for the heat conditioning of core rods in a variety of operations requiring different heating conditions and/or temperature distribution along the length of the core rod.

We claim:

1. Core rod conditioning device for injection blow molding machine, said device comprising means for heating said core rod prior to the formation of plastic parisons thereon, said means including means for selectively distributing said heat input to said core rod along the length thereof, wherein said heating means comprises means for passing hot gas into contact with said core rod at preselected locations along the length thereof, wherein said heating means comprises a tubular member extending along the length of said core rod with openings therein at said pre-selected locations to be heated, further including baffle means for directing hot gases exiting said tubular member through said openings into contact with said core rod, wherein said tubular member encloses a second and smaller diameter tubular member, said second tubular member including a heat means in the walls thereof, said device further including means for introducing compressed gas into said second tubular member at one end thereof, closure means at both ends of said larger diameter tubular member and, at the end of said second tubular member opposite that at which said compressed gas is introduced, means for permitting said compressed gas to pass from said second tubular member into the annular space between said tubular members.

* * * * *

UNITED STATES PATENT OFFICE
CERTIFICATE OF CORRECTION

Patent No. 3,778,223                    Dated December 11, 1973

Inventor(s) Theodore C. Wheaton, III, Albert J. Tamagni
            Robert W. Moshinsky It is certified that error appears in the above-identified patent and that said Letters Patent are hereby corrected as shown below:

Col. 1, line 1 insert "a" after --to--.

Col. 2, line 37 "15" should be --16--.

Col. 4, line 5 "presenting" should be --preventing--.

Col. 4, lines 29 and 30 "conditions" should be --conditioning--.

Signed and sealed this 18th day of June 1974.

(SEAL)
Attest:

EDWARD M. FLETCHER, JR.            C. MARSHALL DANN
Attesting Officer                   Commissioner of Patents